United States Patent [19]

Oprea et al.

[11] Patent Number: 5,544,158
[45] Date of Patent: Aug. 6, 1996

[54] METHOD FOR MULTIPLE ACCESS IN A DIGITAL COMMUNICATION SYSTEM

[75] Inventors: Dan Oprea, Kanata; Jacob Cepelinski, Nepean, both of Canada

[73] Assignee: Mitel Corporation, Kanata, Canada

[21] Appl. No.: 191,470

[22] Filed: Feb. 4, 1994

[30] Foreign Application Priority Data

Feb. 9, 1993 [CA] Canada ................................ 2089101

[51] Int. Cl.⁶ .................................................. H04J 3/00
[52] U.S. Cl. ...................... 370/29; 370/109; 370/110.1
[58] Field of Search ................. 370/95.1, 95.3, 370/95.2, 118, 110.1, 112, 109.0, 94.1, 85.8, 85.7, 108, 29, 103; 340/825.08, 825.54

[56] References Cited

U.S. PATENT DOCUMENTS

| | | | |
|---|---|---|---|
| 4,394,756 | 7/1983 | Canniff | 370/56 |
| 4,467,473 | 8/1984 | Arnon et al. | 370/109 |
| 4,476,558 | 10/1984 | Arnon | 370/104 |
| 4,589,110 | 5/1986 | Eng et al. | 370/118 |
| 4,742,512 | 5/1988 | Akashi et al. | 370/104.1 |
| 4,809,268 | 2/1989 | Tejimu et al. | 370/13 |
| 4,937,819 | 6/1990 | King | 370/95.3 |
| 4,940,974 | 7/1990 | Sojka | 370/95.2 |
| 5,040,177 | 8/1991 | Martin et al. | 370/110.1 |
| 5,051,992 | 9/1991 | Taniguchi et al. | 370/94.1 |
| 5,181,199 | 1/1993 | Motoki et al. | 370/60 |

FOREIGN PATENT DOCUMENTS 2174871  11/1986  United Kingdom.

OTHER PUBLICATIONS

"Telecommunications protocols and design" by Spragins pp. 398–401, 1991.
Fred Halsall "Data Communications, Computer Network and Open System" 1992, Addison–Wesley p. 205.
Integrated Services Digital Network Basic Access Interface for Sand T Reference Point T1.605–1991.

Primary Examiner—Benedict V. Safourek
Assistant Examiner—Ajit Patel
Attorney, Agent, or Firm—Marks & Clerk

[57] ABSTRACT

A digital data communications system, comprises a master station and a plurality of slave stations communicating with said master station in a multiburst scheme over a digital link having a plurality of communication channels associated respectively with said slave stations. In each frame the master station transmits a master burst over all the channels and the slave stations transmit slave bursts over the respective channels associated therewith.

7 Claims, 4 Drawing Sheets

TCM in a multiburst arrangement

S = start bit  A = Address bits (A0, A1)
p = propagation delay  Tg, g = guard time
Twr = reception delay for window  Twt = transmission delay for window Multiburst Mode Timing on the Line $W_{B_1} = 2p_M + 2g + \text{burst}$ $P_M$ = Max. Propagation Delay
$P_m$ = Min. propagation Delay
$g$ = guard time
$W_{B_1}$ = transmission window (delay) for burst $B_1$ $W < 2p_M + 2g + D_{burst}$

METHOD FOR MULTIPLE ACCESS IN A DIGITAL COMMUNICATION SYSTEM

BACKGROUND OF THE INVENTION

This invention relates to a digital data communications system, and more particularly to a system comprising a master station and a plurality of slave stations connected to the master station over a digital link.

The invention finds application in a number of environments with distributed processing, for example in short-loop applications, such as PBX or in optical-fibber distributed systems. In such systems there is a need to provide multiple access to the slave stations while optimizing the use of available bandwidth, which may be limited. The data can be in any form of digital data, including digitized voice signals.

In an ISDN data transmission system, ranges of up to 4 kilometers on a twisted pair subscriber loop can be achieved using echo cancellation techniques at a subscriber data rate of 144 kbps (2B+D channels). An echo cancellation technique, however, is not easy to implement in a point to multipoint (multidrop) configuration.

SUMMARY OF THE INVENTION

An object of the invention is to provide a data transmission system capable of working in a multidrop environment over relatively short subscriber loops, up to about 1 kilometer.

Accordingly, the present invention provides a digital data communications system, comprising a master station and a plurality of slave stations communicating with said master station in a multiburst scheme over a digital link having a plurality of communication channels associated respectively with said slave stations, and wherein in each frame said master station transmits a master burst over all said channels and said slave stations transmit a slave burst over the respective channels associated therewith.

The transmission method is based on a time compression multiplexing scheme. By using a multiburst arrangement in a multidrop environment the practical implementation of the system is simplified.

In time compression multiplexing, data is transmitted in one direction at a time, with transmission alternating between the two directions in sync with system PCM frame. To achieve the desired data rate, the subscriber's bit stream is divided into equal segments, compressed in time to a higher bit rate, and transmitted in bursts which can be expanded at the other end to the original rate. A short quiescent period is used between bursts to allow the line to settle down.

The effective bit rate, R, as seen by the two end points when the size of a transmitted block in bits is B will be:

$$R = B/2(T_p + T_b + T_g)$$

where Tp is the propagation delay Tb is the time required to transmit a data block B, and Tg is the guard time at the end of the PCM frame.

The actual bit, A on the medium will be $$A = B/T_b$$

Combining the two:

$$A + 2R \ (1 + (T_p + T_g)/T_b)$$

Thus, the actual bit rate is more than double the effective data rate seen by the two sides. For the basic ISDN data rates of 144 kbps, the bit rate is in the neighborhood of 350 kpbs.

The choice of block size, B, is a compromise between competing requirements. If B is increased, there is a decrease in the bit rate. On the other hand, this is accompanied by an increase of implementation complexity due to buffering. The value used by most of the TCM users is 16–24 bits.

A number of companies offer different ICs for implementing TCM, which are designed to operate only in a point-to-point configuration. Examples of such chips are:

DASL TP3401 from National Semiconductor,
AM 2059 from Advanced Micro Devices, and
LXT130, LXT134 from LEVEL ONE Companies like BNR have developed proprietary TCM IC's: the NTX12 and NTX11.

In an ISDN data transmission system according to this invention, the digital link normally includes two base rate (B) channels operating at 64 kbps and one data (D) channel operating at 16 kbps. The slave stations transmit bursts headed by address bits on the respective B and D channels associated therewith, and the master station transmits a master burst over the combined channels. For example, Slave 1 may be associated with the D channel, Slave 2 with the B1 channel, and Slave 3 with the B2 channel. Using a channel address for every burst simplifies the practical implementation and permits the generalization of the method to a large field of applications. The master receiver implements the function of a receiver ready to receive the different slave bursts within different time windows.

The separation of individual channel bursts into time windows is required to reduce signal interference between slave stations. Consequently, the bit rate on the line increases to the neighborhood of 500 kbps. While the number of channels available in an ISDN base rate data transmission system is only 3 (2B+D), multiple slave stations can alternately access each one of the channels. Normally, the access to the D-channel is done by an arbitration protocol among the slave stations and the channel is used for control. Normally, the access to a B-channel is done by connect/disconnect commands transmitted over the D-channel.

The method is particularly attractive in short loop applications (PBX) or in optical fiber distributed systems.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
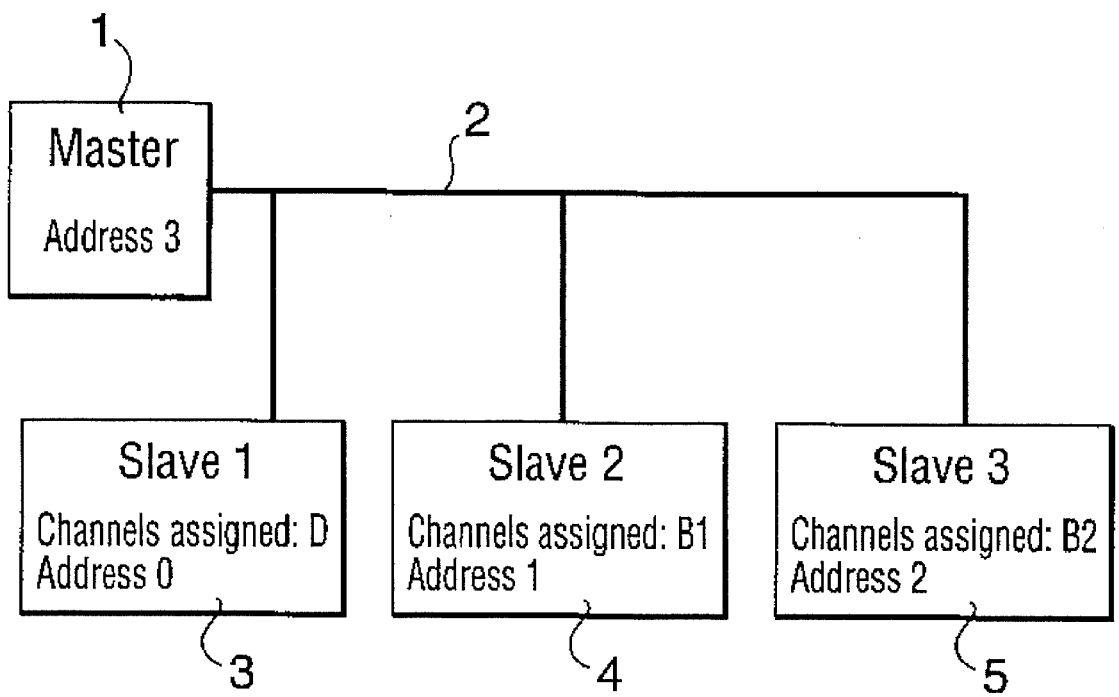
FIG. 1 is a block diagram of a data communications system in accordance with the invention.
Figure 1:
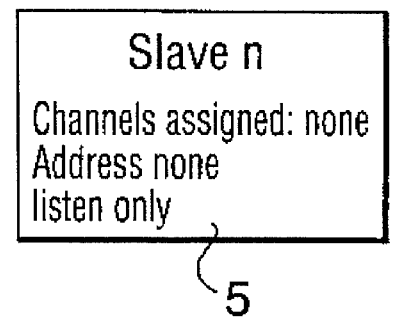

Referring now to FIG. 1, the data communications system forming part of a PBX (Private Branch Exchange) comprises a master station 1 connected over a twisted two-wire line 2 to slave stations 3, 4, 5. The two-wire line provides a standard ISDN link having two base rate channels at 64 kbps and one data channel at 16 kbps, making a total of 144 kbps. The physical implementation uses Alternate Mark Inversion line code at 512 kbps symbol rate and 250 μs frame.

Each one of the channels is identified by a two bit address, to be transmitted, preceding the channel data bits, by the slave stations 3, 4, 5. The following channel addresses are defined:

D-channel—Address 0
B1-channel—Address 1
B2-channel—Address 2

Address 3 is reserved for combined 2B+D channels to be transmitted by the master station 1.

Figure 2:
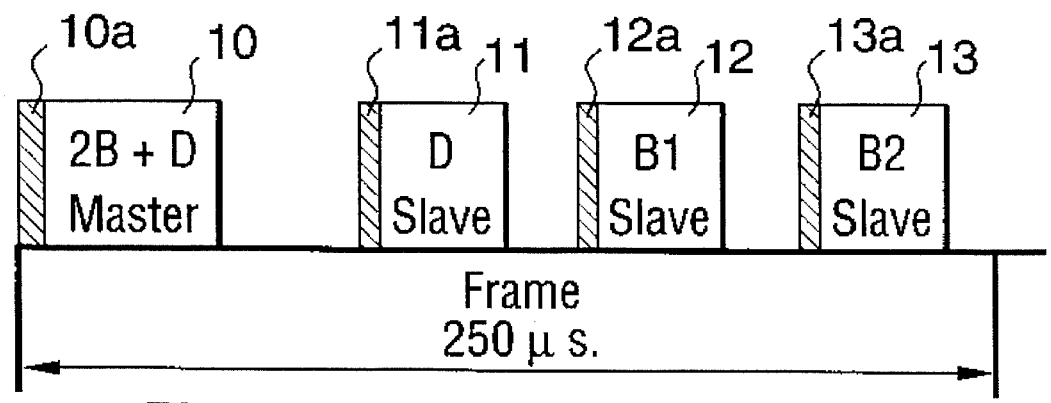
FIG. 2 shows a timing diagram of a digital data communications system in accordance with one embodiment of the invention.

As shown in FIG. 2, in each frame the master station transmits a master burst 10 having an address header 10a over the combined 2B+D channels. Slave station 3 transmits burst 11 with address header 11a over the D channel, slave station 4 transmits burst 12 with address header 12a over the B1 channel, and slave 5 transmits burst 13 with address header 13 over the B2 channel. The multiburst format is shown in more detail with reference to FIGS. 3a to 3d.

Figure 3A:
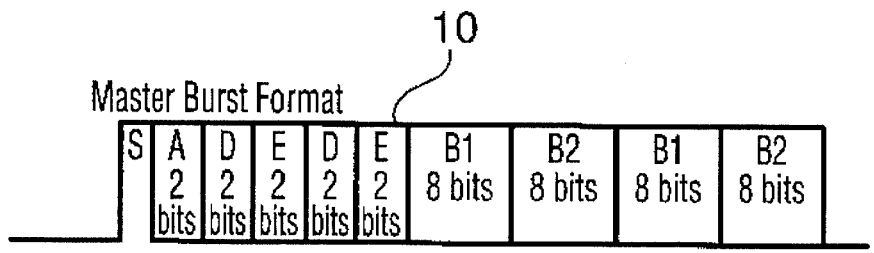
FIGS. 3a to 3d show the multiburst mode timing on the digital link.

FIG. 3a shows the format of the master burst 10. This comprises a start bit followed by a two bit address, followed by two bits on the D channel, two echo bits, two more bits on the D-channel, two more extra bits and followed by 32 bits on the B1 and B2 channels. The echo bits are provided to support D-channel access protocol as in standard ISDN.

Figure 3B:
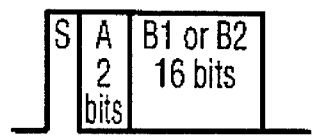

FIG. 3b shows the format of a slave burst. This is simpler than the master burst and comprises a start bit, followed by a two bit address, and 16 bits of data on channel B1 or B2.

Figure 3C:
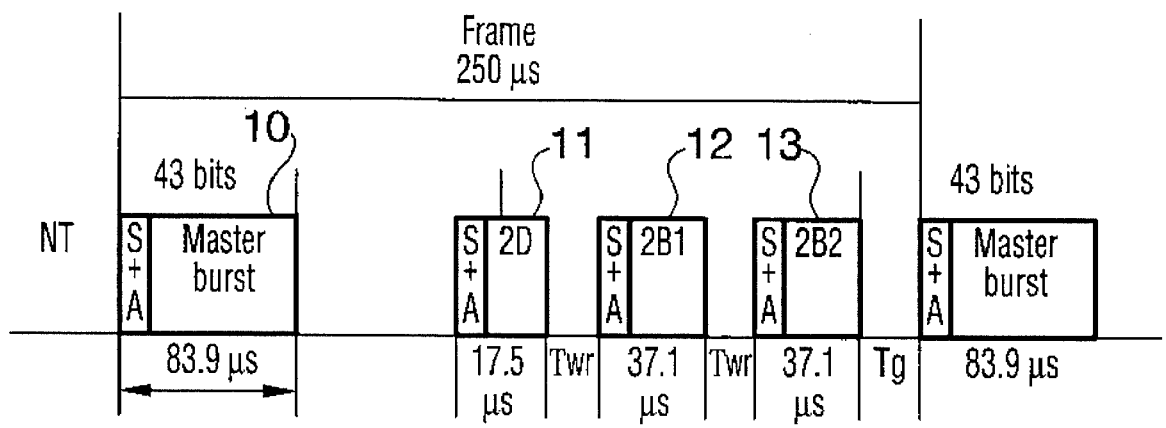

FIG. 3c shows a complete 250 μs PCM frame at the PBX or Near Terminal (NT). The master burst 10, which comprises 43 bits, takes up 83.98 μs while the first slave burst 11, transmitting on the D channel, takes up 17.5 μs. The bursts 12 and 13, associated with respective slaves 4 and 5, have 19 bits and take up 37.1 μs. The scheme shown in FIGS. 3a to 3d represents a 250 μs frame multiburst structure. The structure can support a terminal drop on a loop of 1 km or more at any point.

Figure 3D:
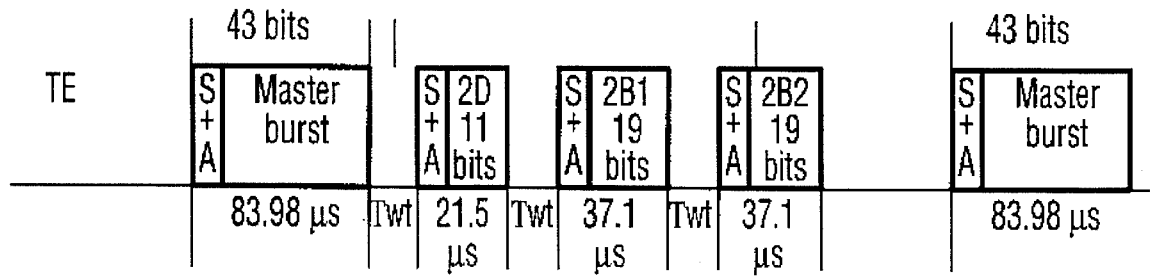

FIG. 3d shows the timing scheme at the terminal end. The bursts are shifted by the propagation delay P occurring over the subscriber line.

The master receiver must receive the three different bursts from the slave stations within three different windows. The windows are defined relative to the master burst end of the frame and the window opening determines the maximum distance between the terminal drops on the line.

Figure 4A:
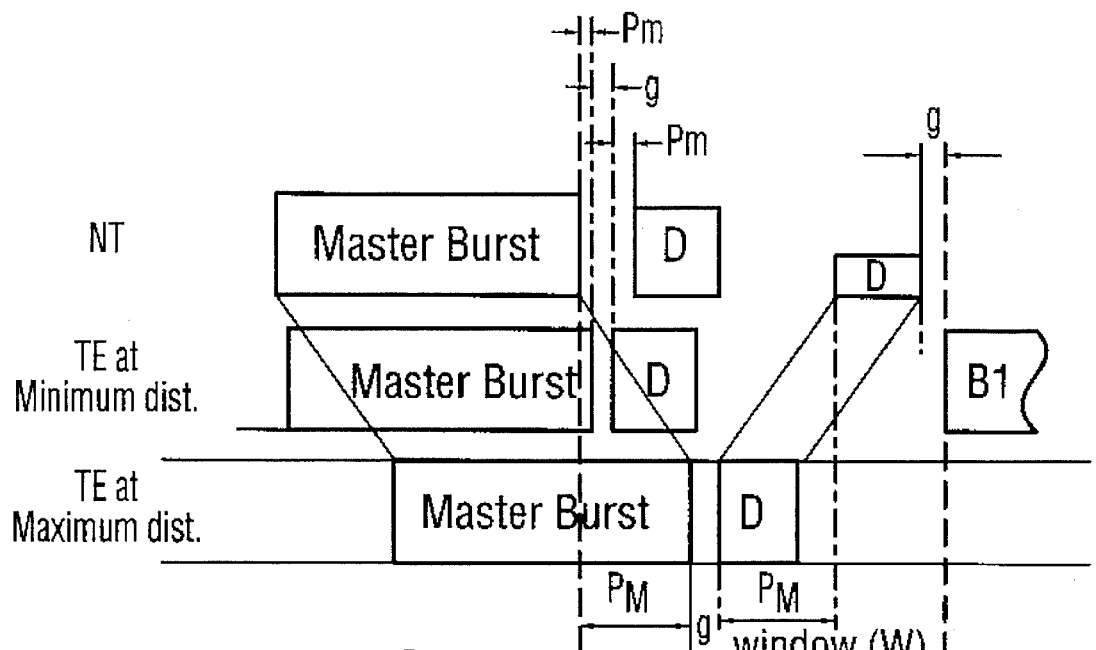
FIG. 4 and 4b show the transmission/reception window definition.
Figure 4B:
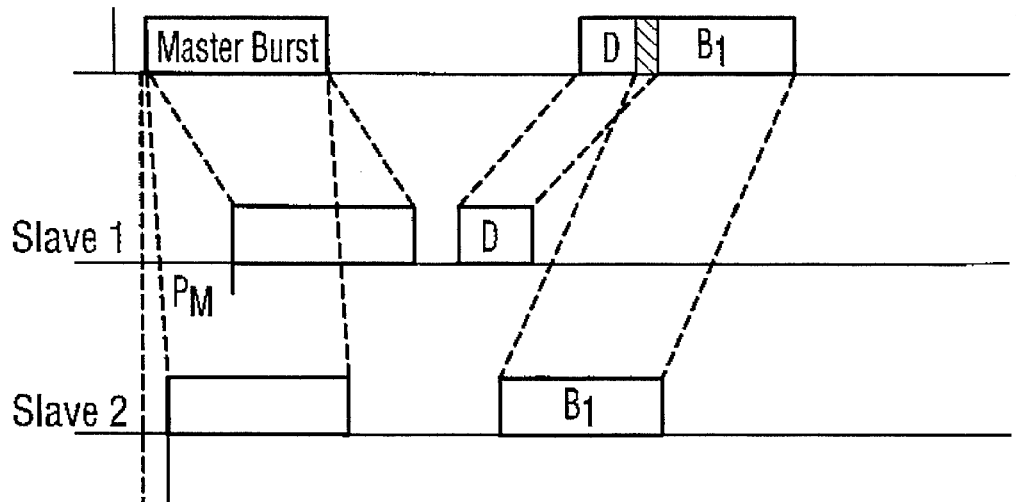

FIGS. 4a and 4b show how the windows are determined. The maximum propagation delay pM is directly related to the maximum the loop length. FIG. 4a shows the propagation delay at the near terminal and at the end terminal for minimum and maximum distances. The reception window for the master station must be greater than or equal to two times the propagation delay plus twice the necessary guard time plus the burst length. Thus, the transmit delay for the burst on the B1 channel must be equal to $2P_M+2g+burst$, where $P_M$ is the maximum propagation delay, g is the guard time, and burst is the duration of the burst. If the burst is sent on the B1 channel before this window has expired, it might interfere with the burst on the D channel as shown in FIG. 4b because if the D slave happens to be at the end of the link, and the B1 slave is at some intermediate position, there could be overlap when both bursts arrive at the master station.

FIG. 4b represents the case of a slave station located close to the master end and using channel B1 (SLAVE 2) and an other far slave station, using channel D (SLAVE 1). The signal window ($W<2P_M+2g+D_{Burst}$) determines the bit interference at the master end.

FIG. 4b shows the receptor windows for the D burst, in this case, $W<2P_M+2g+D$ burst.

Suitable line drivers must be chosen as a compromise between competing requirements. Simple line drivers require higher transformer performance, making the transformers more expensive, and limiting the loop length to be in the order of 500 m. Increasing the transceiver complexity (pre-equalized and filtered AMI signal generated, and the use of adaptive threshold detectors) can increase the subscriber loop range up to 2 km or more.

Reference will now be made FIGS. 5a and 5b.

Figure 5A:
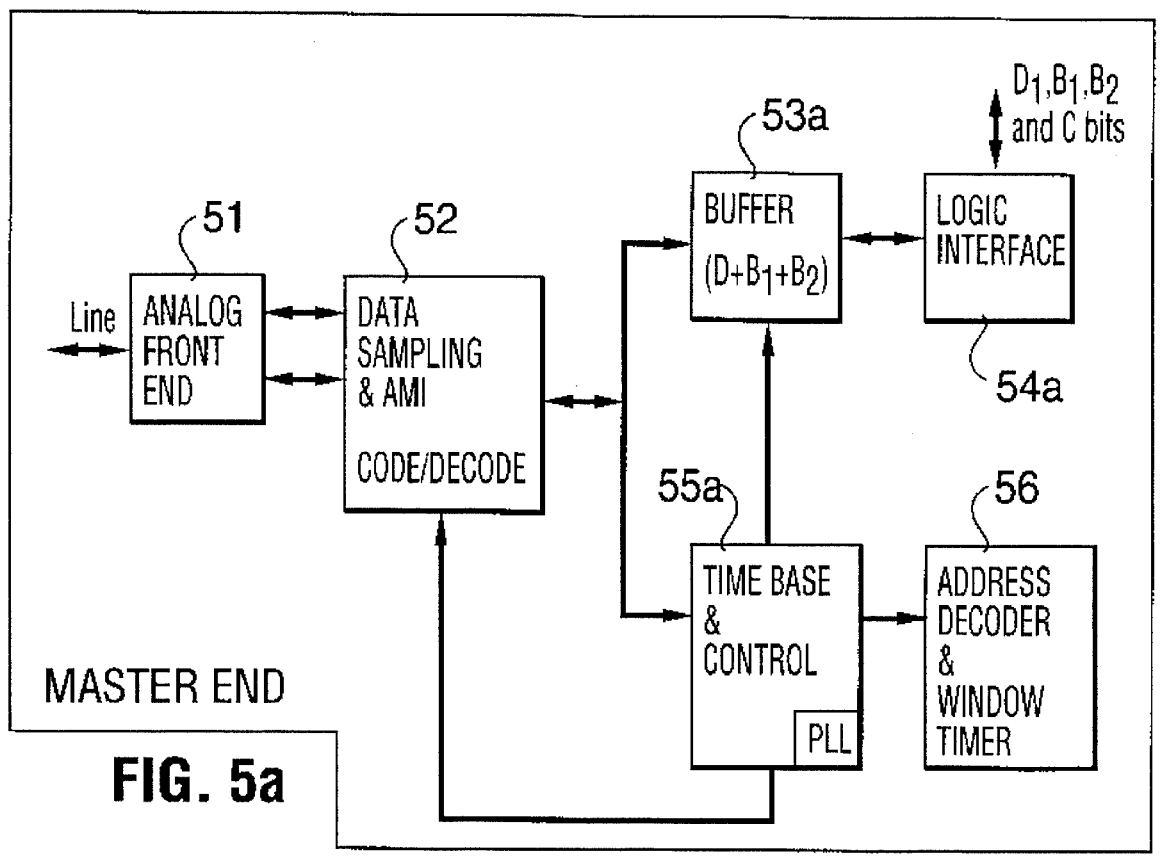
FIG. 5a is a block diagram of a master end multiburst TCM receiver.

In FIG. 5a, it will be seen that the master end control circuitry is more complex, and includes a PLL (Phase-locked loop) circuit for timing recovery. The address decoder and window timer permits the reception of the appropriate channel and the data storage ($BUFFER_{D+B_1}+B_2$). The master end comprises an analog front end 51, a data sampling unit 52, a transmit/receive buffer 53a, logic interface unit 54a, timing recovery and state control machine 55a for carrying out control functions, and address decoder and reception window timer implemented according to the propagation delay for the maximum loop length. The logic interface unit 54a converts the incoming/outgoing data stream into a specific format, for example Mitel ST-bus format.

Figure 5B:
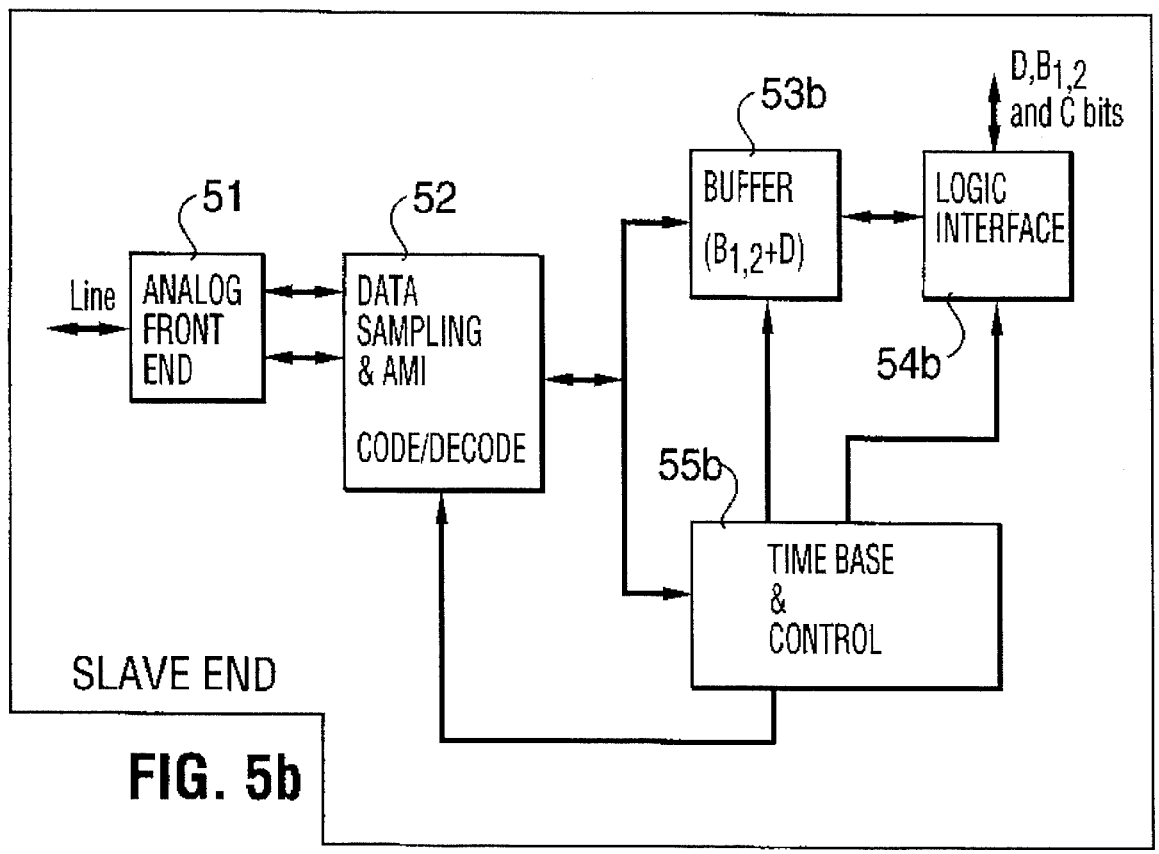
FIG. 5b is a block diagram of the timing and control circuitry of a multiburst TCM transceiver at the receiving end.

The slave end is simpler, as shown in FIG. 5b where like parts are identified with similar reference numerals to those used in FIG. 5a. The buffer size is limited to the D channel and one B channel. The start bit and the two following bits (the address 3) permit a simple implementation of a locked clock scheme to sample the incoming data.

The transceiver can be implemented as an ASIC gate array. In the case of multidrop TCM implementation, the digital analog functions are partitioned into two different components: the ASIC (all digital functions) and the line receiver (all analog functions).

We claim:

1. A digital data communications system, comprising a master station; a plurality of slave stations; a multidrop 2B+D ISDN digital link comprising two base rate channels B1, B2 and one data channel D from said master station to said slave stations and two base rate channels B1, B2 and one data channel D from said slave stations to said master station, said digital link being connected to said master station; said plurality of slave stations associated with the channels of said digital link distributed at points along said digital Link and communicating with said master station via said digital link over said slave to master channels in a time compression multiplex scheme employing data bursts, said master station including means for transmitting in a multiplex frame a master burst over said master to slave channels, and means for receiving in the multiplex frame slave bursts from the respective slave stations; and said slave stations each including means for transmitting slave bursts over respective channels associated therewith in said multiplex frame; and said transmitting means at said slave stations transmitting said slave bursts in time windows spaced within the multiplex frame to allow for propagation delays along said link and prevent bit interference in said receiving means at said master station.

2. A digital data communications system as claimed in claim 1, wherein each burst includes an identifying channel address followed by data.

3. A digital data communications system as claimed in claim 1, wherein each channel is identified by a specific two-bit address.

4. A digital data communications system as claimed in claim 3, wherein the D channel of master to slave has address 0, the B1 channel of master to slave has address 1, the B2 channel of master to slave has address 2, and the master station has address 3.

5. A digital data communications system as claimed in claim 1, wherein a slave station access to said D channel is performed in accordance with an arbitration protocol to which each slave station adheres.

6. A digital data communications system as claimed in claim 5, wherein a slave station access to B1 or B2 channel of slave to master is performed by a channel assignment command communicated over said D channel to the slave station.

7. A digital data communications system as claimed in claim 1, wherein the width (W) of each window is selected such that it satisfies the expression:

$$W >= 2P_M + 2g + \text{burst}$$

where $P_M$ is the maximum propagation delay along the link, g is a guard time, and burst is the duration of the burst within the window.

* * * * *